Figure 1:
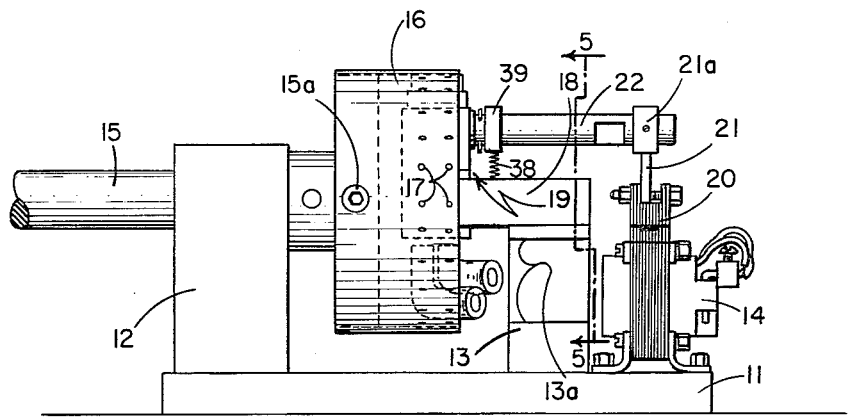

May 28, 1963  A. L. SCOTTI  3,091,216
MACHINE FOR INTERMITTENT APPLICATION OF ADHESIVE
Filed April 5, 1961  3 Sheets-Sheet 1

INVENTOR.
ARTHUR L. SCOTTI
BY
ATTORNEY.

INVENTOR.
ARTHUR L. SCOTTI
BY
ATTORNEY

May 28, 1963 A. L. SCOTTI 3,091,216
MACHINE FOR INTERMITTENT APPLICATION OF ADHESIVE
Filed April 5, 1961 3 Sheets-Sheet 3

INVENTOR.
ARTHUR L. SCOTTI
BY
ATTORNEY.

United States Patent Office 3,091,216
Patented May 28, 1963

3,091,216
MACHINE FOR INTERMITTENT APPLICATION OF ADHESIVE
Arthur L. Scotti, Belmont, Mass., assignor to Prod-O-Matic, Inc., Cambridge, Mass., a corporation of Massachusetts
Filed Apr. 5, 1961, Ser. No. 100,939
5 Claims. (Cl. 118—406)

This invention relates to apparatus for the intermittent application of adhesive. In particular it relates to the intermittent application of adhesive to a continuous moving strip of material, as for example, paper.

In the co-pending patent application of Peter I. Gleba entitled "Method and Machine for Intermittent Application of Adhesives," Serial No. 84,673, filing date January 24, 1961, several novel machines for the intermittent application of adhesive are described. The principal features of these machines are a rigid outlet means containing an orifice, means for supporting adhesive under pressure to the orifice, a perforated movable plate member in contact with the orifice, means for causing registration of orifice and perforations, and means for placing said strip in contact with the opposite surface of the plate member. The plate members described in this application included a flexible member such as an endless belt or rotatable flexible disc and a reciprocating plate such as a rockable curved plate. Although these described embodiments are capable of carrying out the purposes of the invention described therein, it was found that each had some disadvantages.

The flexible belt or disc required frequent attention to maintain its orientation, while the rockable curved plate was not suitable for producing discrete dots of adhesive although suitable for producing short lines.

One object of the present invention is to provide an improved apparatus for controlled intermittent application of adhesive which will require little or no maintenance and which will be equally satisfactory for the production of adhesive dots, as well as short adhesive lines.

Further objects and advantages of this invention will be apparent from the specification and claims which follow and from the appended drawings which illustrate a preferred embodiment.

The invention comprises generally an adhesive delivery member having a rigid convex top surface containing an outlet orifice in contact with the inner surface of a rotatable metal cylindrical shell having at least one perforation registerable with the orifice. Adhesive is supplied under pressure through conduits to the orifice. When the strip of paper or other material which is to be coated is moved against the opposite surface of the metal shell in line with the orifice, adhesive flows onto the paper only when a perforation of the plate is in registration with the orifice of the adhesive delivery block. As soon as the plate moves out of registration further flow of the adhesive is cut off in a sharp manner so that there is no running or leaking of adhesive.

Figure 2:
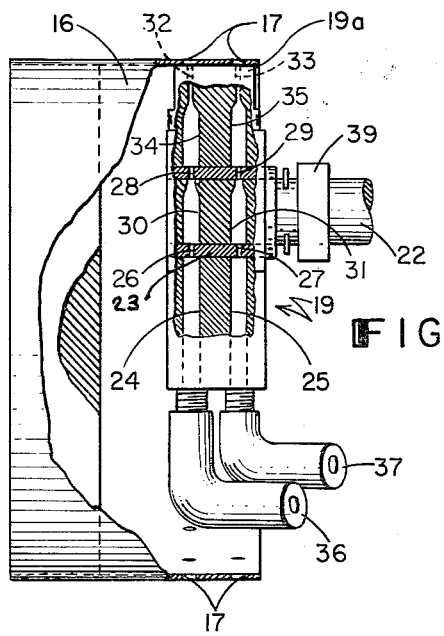
Figure 3:
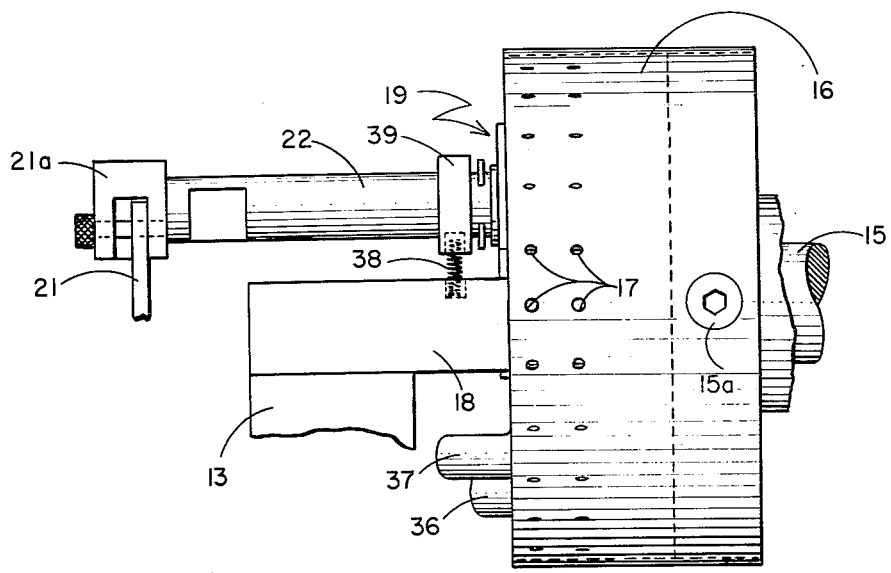
Figure 4:
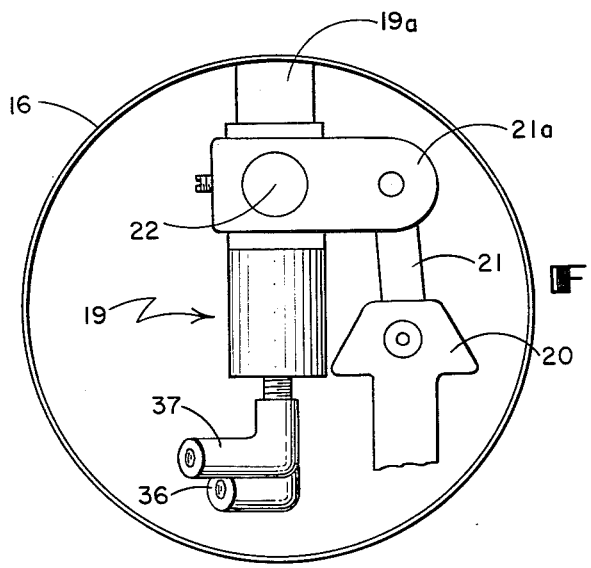
Figure 5:
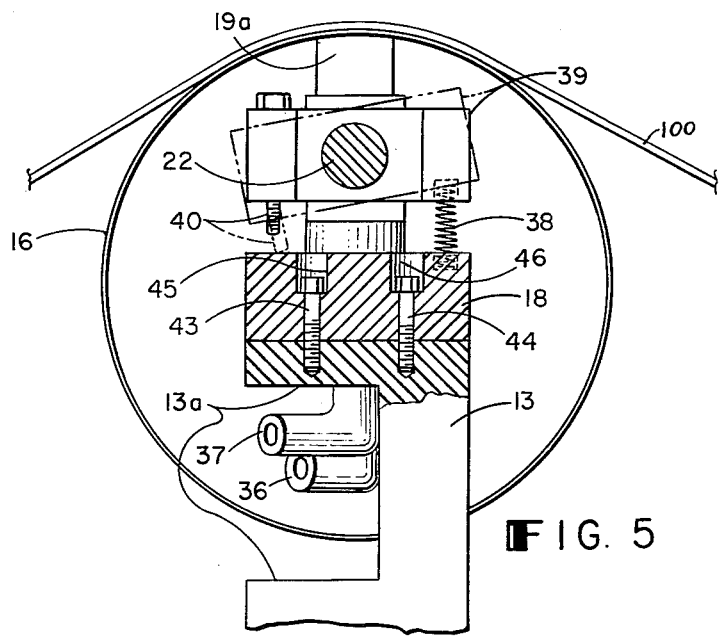
Figure 6:
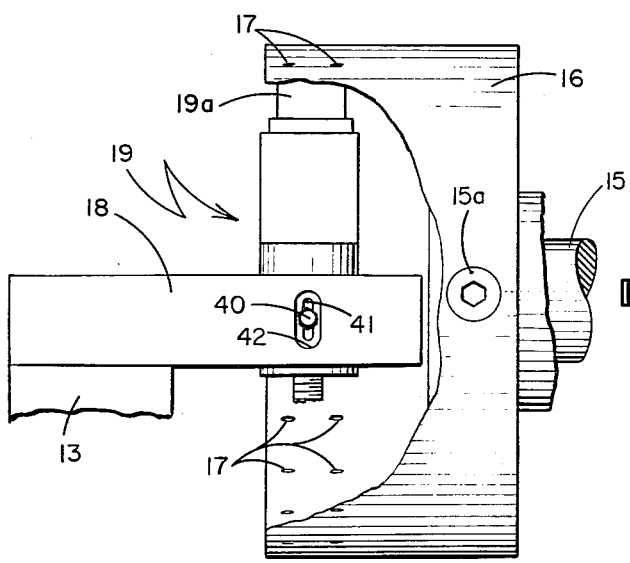

One embodiment of the invention is illustrated in the drawings wherein:

FIGURE 1 is a front elevation.
FIGURE 2 is an enlarged partially sectioned view of FIGURE 1.
FIGURE 3 is a partial rear elevation.
FIGURE 4 is a partial left end view.
FIGURE 5 is a partially sectioned end view along line 5—5 of FIGURE 1 showing a strip of paper.
FIGURE 6 is a partial rear elevation with a portion broken away.

Referring now to the drawings there is shown therein a base 11 which supports a shaft block 12, U-block 13 and solenoid 14. One end of a rotatable shaft 15 is supported by block 12, the other end of the shaft being supported by a driving means not illustrated. Bolts 15a hold a cylindrical metal shell 16 on shaft 15. The shell 16 is closed at one end but open on the other. At its open end it has spaced perforations 17 in two circular lines whose planes are perpendicular to the axis of the shaft. 13a designates the open portion of U-block 13 which has adjustably mounted on its top surface a horizontal member 18 for supporting an adhesive block 19 in a vertical position within the shell so that the top surface of the adhesive block just grazes the inside surface of the metal shell 16. The top surface of block 19 is rigid and hard and has a similar curvature as the shell. The solenoid 14 has its actuating member 20 connected by pivotal extension 21 to pivot member 21a whose other end is fixedly connected to a second shaft 22. This second shaft 22 extends into the adhesive block where it is retained by a bushing 23.

The adhesive block 19 contains a pair of vertical conduits which extend from the bottom to the top. At the top the orifices 32 and 33 of the conduits are of the order of magnitude of 0.050 inch and the top curved surface of the rigid portion 19a in which the orifices are formed is relatively tight against the inner surface of the shell 16. The upper portions 34 and 35 of the conduits are interrupted by the bushing 23 which has aligned orifices 26—28 and 27—29. The portion of the shaft 22 which is seated in the bushing acts as a rotary valve and is provided with two transverse channels 30 and 31 which will align with the bushing orifices and the bottom conduit portions 24 and 25 when the shaft is in proper orientation.

In operation a strip of paper 100 or similar material is positioned so that it is in contact with the top of the outer surface of the shell 16 adjacent the orifice. When the strip of paper is caused to move, the solenoid is actuated so as to place the channels 30 and 31 in alignment with conduits 24 and 25 and 34 and 35 and thus provide two complete paths from the bottom of the adhesive block to the top orifices 32 and 33. Adhesive is supplied under pressure to the block through supply conduits 36 and 37 from a supply source not illustrated. The rotation of the shell is preferably synchronized with the movement of the paper. As the paper and shell move, successive perforations are placed in registration with the orifices permitting dots of adhesive to be impinged in a spaced arrangement on the moving paper.

When the current is off spring 38 acts on transverse member 39 so as to rotate shaft 22 and thus turn its valve portion out of alignment with respect to the adhesive conduits in the adhesive block. Stop 40 on member 39 acts to limit the rotation of shaft 22.

It has been found that this invention as described is not only efficient and free of abnormal maintenance requirements but also provides uniformly spaced adhesive dots on a strip of paper moving as fast as 500 feet a minute. No particular pressure means are required to keep the strip of paper in contact with the upper portion of the metal shell. However, it is recommended that the web feed be from above at a slight oblique angle and that a light brush be suspended on the position where the paper contacts the shell to maintain appropriate contact.

As illustrated in the drawings, several adjustments are preferably provided. Horizontal adjustment is provided for proper positioning of the adhesive block with respect to the shell by screws 43 and 44 recessed in horizontal slots 45 and 46 in horizontal member 18 and threaded into support member 13. Vertical adjustment for the adhesive block is provided by screw 40 held on flange 42 of vertical slot 41 in member 18 and threaded into block 19. The shell is preferably constructed of corrosive or water resistant material such as stainless steel in the order of magnitude of 0.010 inch thickness. Although two circular rows of perforations are provided in the shell, a larger number or even a single row can be used, depending on the adhesive requirements. A typical spacing of the perforations is ½ inch. In construction the bushing is preferably a pressed-in bushing. The diameter of the several conduits and channels may be varied. However, the exit orifices 32 and 33 are usually of slightly smaller diameter than the shell perforations 17.

The foregoing is illustrative of the broad principles of this invention. It will be apparent to those skilled in the art that various modifications and in the details of construction described above may be made without departing from the spirit and scope of the present invention. Accordingly, it is to be understood that the foregoing description is primarily illustrative of the invention and is not to be considered as limiting the scope thereof.

I claim:

1. A machine for the intermittent application of adhesive comprising in combination, an adhesive delivery member having a rigid convex top surface, said top surface having an orifice and conduit means for connecting said orifice with a source of adhesive supply under pressure and a rotatable cylindrical metal shell which has at least one perforation and is in contact with the said top surface containing said orifice; said orifice and perforation being registerable upon rotation of said shell, said cylindrical shell being so positioned as to surround said adhesive delivery member.

2. The apparatus of claim 1 wherein a rotatable valve is provided in said adhesive delivery member for controlling said conduit means.

3. The apparatus of claim 1 wherein a solenoid-controlled rotatable valve is provided in said adhesive delivery member for controlling said conduit means.

4. A machine for the intermittent application of adhesive comprising in combination a longitudinal rotatable shaft, a cylindrical metal shell attached at one end to said shaft and having its other end open, and a longitudinally-supported adhesive delivery member spaced within said shell at the open end; said shell having at least one perforation; said adhesive delivery member having a rigid top surface, said top surface having an orifice, and conduit means for connecting said orifice with a source of adhesive supply under pressure; said shell being in contact with said rigid top surface containing said orifice; said orifice and perforation being registerable upon rotation of said shaft.

5. The machine of claim 4 wherein there is a rotatable valve in said adhesive delivery member for controlling said conduit means; said valve being rotated by a longitudinal, solenoid-operated shaft.

References Cited in the file of this patent

UNITED STATES PATENTS

| | | |
|---|---|---|
| 2,251,264 | Berch et al. | Aug. 5, 1941 |
| 2,333,383 | Kent | Nov. 2, 1943 |
| 2,698,574 | Daugherty | Jan. 4, 1955 |
| 2,736,290 | Scholl | Feb. 28, 1956 |
| 2,928,340 | Stein | Mar. 15, 1960 |